(12) United States Patent
Wang et al.

(10) Patent No.: US 8,451,031 B2
(45) Date of Patent: May 28, 2013

(54) ADJUSTABLE FINITE IMPULSE RESPONSE TRANSMITTER

(75) Inventors: Charles Wang, Los Altos, CA (US);
Randall Shaw, Cedar Rapids, IA (US)

(73) Assignee: Advanced Micro Devices, Inc., Austin, TX (US)

( * ) Notice: Subject to any disclaimer, the term of this patent is extended or adjusted under 35 U.S.C. 154(b) by 225 days.

(21) Appl. No.: 12/944,464

(22) Filed: Nov. 11, 2010

(65) Prior Publication Data

US 2012/0119792 A1    May 17, 2012

(51) Int. Cl.
*H03B 21/00* (2006.01)
*H03B 1/00* (2006.01)
*H03K 3/00* (2006.01)

(52) U.S. Cl.
USPC ........... 327/108; 327/109; 327/110; 327/111; 326/82; 326/83; 326/84; 326/85; 326/87

(58) Field of Classification Search
USPC .................. 327/108–112; 326/82–85, 87
See application file for complete search history.

(56) References Cited

U.S. PATENT DOCUMENTS

| | | | | |
|---|---|---|---|---|
| 6,549,031 B1 * | 4/2003 | Jex et al. | ............... | 326/30 |
| 6,704,818 B1 * | 3/2004 | Martin et al. | ............... | 710/100 |
| 6,864,726 B2 * | 3/2005 | Levin et al. | ............... | 327/112 |
| 7,307,447 B2 * | 12/2007 | Clements et al. | ............... | 326/30 |
| 7,902,883 B2 * | 3/2011 | Hidaka | ............... | 327/108 |
| 7,911,222 B2 * | 3/2011 | Cheng et al. | ............... | 326/21 |
| 2004/0155683 A1 * | 8/2004 | Ajit | ............... | 327/112 |
| 2004/0257127 A1 * | 12/2004 | Levin et al. | ............... | 327/112 |
| 2005/0219729 A1 * | 10/2005 | Franck | ............... | 360/46 |
| 2007/0103186 A1 | 5/2007 | Clements et al. | | |
| 2008/0218222 A1 | 9/2008 | Nishi | | |
| 2009/0315592 A1 * | 12/2009 | Hidaka | ............... | 327/108 |
| 2012/0119792 A1 * | 5/2012 | Wang et al. | ............... | 327/108 |

FOREIGN PATENT DOCUMENTS

WO    01/93425 A1    12/2001

OTHER PUBLICATIONS

International Search Report issued Mar. 23, 2012 in PCT/US2011/059754.
Kossel, M. et al., "A T-Coil-Enhanced 8.5 Gb/s High-Swing SST Transmitter in 65 nm Bulk CMOS With <—16 dB Return Loss Over 10 GHz Bandwidth," IEEE Journal of Solid-State Circuits, IEEE Service Center, Piscataway, NJ, USA, vol. 43, No. 12, Dec. 1, 2008.
U.S. Appl. No. 12/857,225, filed Aug. 16, 2010.

* cited by examiner

*Primary Examiner* — Adam Houston
(74) *Attorney, Agent, or Firm* — Ingrassia Fisher & Lorenz, P.C.

(57) ABSTRACT

Apparatus and methods are provided for generating output signals representative of bits of serial data. A transmitter includes driver circuitry configured to generate an output signal at an output node and an allocation control module coupled to the driver circuitry. The driver circuitry includes a plurality of driver legs configured to generate the output signal based on a plurality of data bits. The allocation control module is configured to allocate a respective subset of the plurality of driver legs to a respective data bit of a plurality of data bits, wherein the each subset generates a component of the output signal that is influenced by its respective data bit.

16 Claims, 5 Drawing Sheets

ADJUSTABLE FINITE IMPULSE RESPONSE TRANSMITTER

TECHNICAL FIELD

Embodiments of the subject matter described herein relate generally to electronic circuits, and more particularly, relate to finite impulse response transmitters and related transmitter circuitry.

BACKGROUND

Many modern electronic devices include multiple processors (e.g., data processors, graphics processors, signal processors, and the like) that cooperate to perform various tasks, functions, or operations. Frequently, data or information must be communicated from one processor to a second processor to enable the second processor to complete a particular task, function, or operation.

Intersymbol interference is one problem encountered when communicating from one processor to another processor over a communication channel. Finite impulse response (FIR) equalization is one technique for mitigating intersymbol interference. In FIR equalization, bits of data are filtered in a manner that accounts for the preceding and/or succeeding bit(s) of the data being transmitted. However, due to manufacturing process variations, it is difficult to achieve a desired equalization in an accurate and repeatable manner, thereby reducing yield. Additionally, these process variations make it difficult to accurately match characteristic impedances, which in turn, may result in signal reflections or other interference that degrades signal quality.

BRIEF SUMMARY

In an exemplary embodiment, an apparatus for a transmitter is provided. The transmitter includes driver circuitry configured to generate an output signal at an output node and an allocation control module coupled to the driver circuitry. The driver circuitry includes a plurality of driver legs configured to generate the output signal based on a plurality of data bits. The allocation control module is configured to allocate a respective subset of the plurality of driver legs to a respective data bit of a plurality of data bits, wherein each respective subset generates a respective component of the output signal that is influenced by its respective data bit.

In accordance with an exemplary embodiment, a computing module includes a processing system, a transmitter, and a control module. The transmitter is coupled to the processing system to transmit an output signal representative of a first bit of data received from the processing system over a serial interface. The transmitter is configured to equalize the output signal using a second bit of the data in accordance with an equalization ratio. In this regard, the transmitter includes a set of driver legs configured to generate the output signal, wherein the control module is configured to allocate the set of driver legs among the first bit and the second bit based on the equalization ratio.

In another embodiment, a method is provided for generating an output signal representative of a first bit of serial data. The method begins by enabling a subset of a plurality of driver legs, resulting in a set of enabled driver legs. The outputs of the plurality of driver legs are coupled to an output node coupled to a serial interface. The method continues by allocating the set of enabled driver legs among the first bit and a second bit of the serial data based on an equalization ratio for the serial interface, and generating the output signal at the output node using the set of enabled driver legs. In this manner, the output signal is equalized by the second bit in accordance with the equalization ratio.

This summary is provided to introduce a selection of concepts in a simplified form that are further described in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Technologies and concepts discussed herein relate to finite impulse response (FIR) equalization transmitters and related circuitry having configurable characteristic output impedance and configurable equalization. As used herein, a FIR equalization transmitter should be understood as referring to a transmitter that generates an output signal at an output node (or output port) that is representative of a particular bit (the main bit) of data by filtering or otherwise equalizing the signal using preceding and/or succeeding bits of the data. In this regard, the preceding and/or succeeding bits of data are used to equalize (or filter) the output signal to compensate for downstream deficiencies of the communication channel coupled to the output node (or output port). For example, the output signal may be equalized or filtered to compensate for noise, distortion, attenuation, or other performance characteristics of the communication channel (e.g., a circuit board trace or another suitable serial interface) coupled to the output node. As described in greater detail below, in an exemplary embodiment, the number of driver legs in the FIR equalization transmitter that are used to generate the filtered output signal is adjustable to achieve a characteristic output impedance target. Additionally, the enabled driver legs are capable of being allocated among the main data bit and the preceding and/or succeeding data bits in a manner that achieves a desired equalization ratio. In this manner, the FIR transmitter may be configured to achieve a desired equalization ratio among the data bits while simultaneously achieving a desired effective output impedance in an accurate and repeatable manner.

Figure 1:
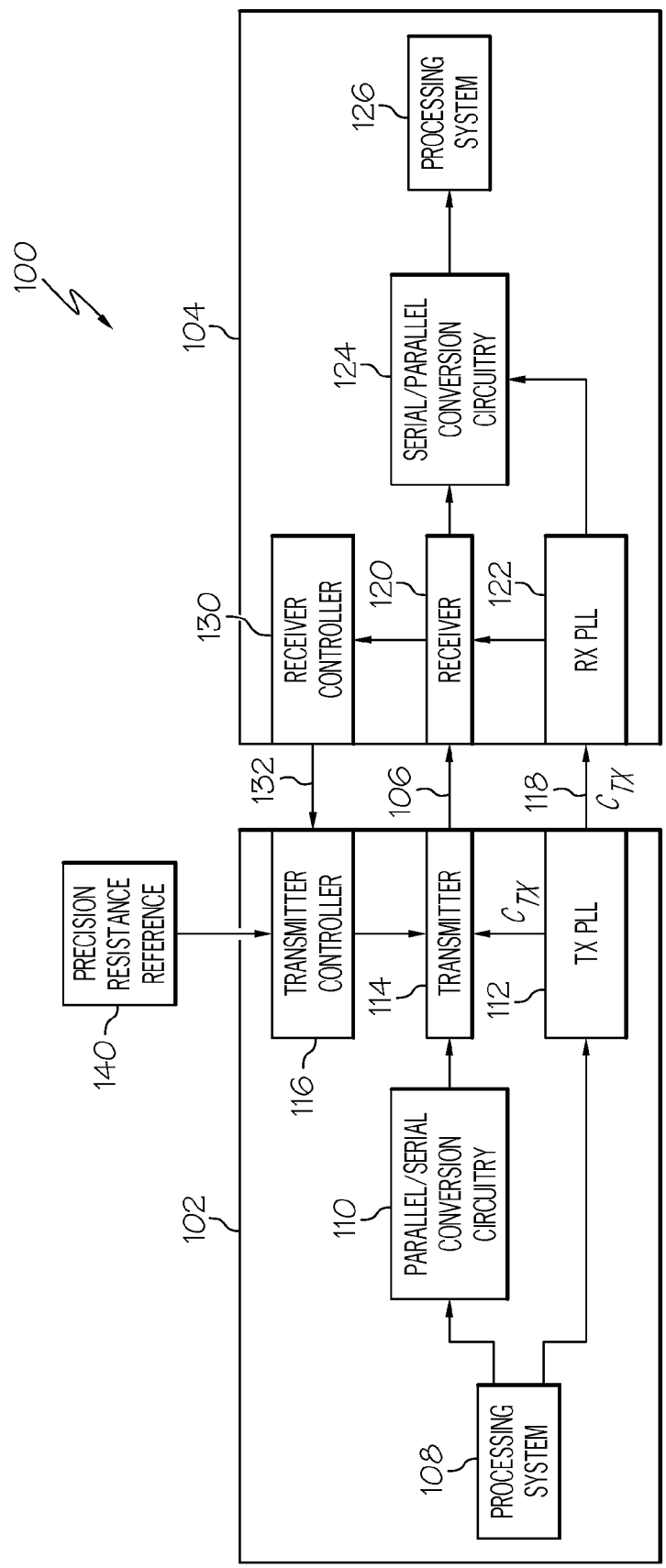
FIG. 1 is a block diagram of a system for communicating between two computing modules in accordance with one embodiment.

FIG. 1 depicts an exemplary embodiment of a system 100 for communicating data over a serial interface 106 from a first computing module 102 (such as a processor, central processing unit (CPU), graphics processing unit (GPU), or the like) to a second computing module 104 (e.g., another processor, CPU, GPU, or the like). The serial interface 106 represents the physical communication channel between the computing modules 102, 104, and depending on the embodiment, the serial interface 106 may be realized as a bus, wire, conductive trace, pin, another suitable interconnection and/or a suitable combination thereof. It should be understood that FIG. 1 is a simplified representation of the system 100 for purposes of explanation and ease of description, and FIG. 1 is not intended to limit the subject matter in any way. Practical embodiments may include other devices and components for providing additional functions and features, and/or the computing modules 102, 104 may be part of a larger system, as will be understood. In this regard, it should be understood that although the subject matter may be described in the context of communicating data from the first computing module 102 to the second computing module 104, the subject matter may be implemented in a like manner for communicating data from the second computing module 104 to the first computing module 102 or for communicating data to other modules not illustrated in FIG. 1, and in some embodiments, the serial interface 106 may be utilized for bidirectional communication between computing modules 102, 104. Furthermore, although FIG. 1 depicts the computing modules 102, 104 as distinct elements (e.g., separate chips and/or device packages), in some embodiments, the computing modules 102, 104 may be implemented as part of a common device package.

In an exemplary embodiment, the first computing module 102 includes, without limitation, a processing system 108, parallel-to-serial conversion circuitry 110, a transmitter phase-locked loop (PLL) 112, a transmitter 114 configured to communicate data over the serial interface 106, and a transmitter controller 116. The processing system 108 generally represents the main processing core for the first computing module 102. In various embodiments, the processing system 108 may be realized using one or more arithmetic logic units (ALUs), one or more floating point units (FPUs), one or more memory elements (e.g., one or more caches), discrete gate or transistor logic, discrete hardware components, or any combination thereof. The processing system 108 is coupled to the parallel-to-serial conversion circuitry 110 and generates or otherwise provides parallelized (or multi-bit) data to be transmitted to the second computing module 104, and provides the parallel data to the parallel-to-serial conversion circuitry 110. The parallel-to-serial conversion circuitry 110 is coupled between the processing system 108 and the transmitter 114, and the parallel-to-serial conversion circuitry 110 generally represents the hardware components that are configured to convert parallel data from the processing system 108 to serialized data capable of being transmitted or otherwise communicated over the serial interface 106. The processing system 108 is also coupled to the transmitter PLL 112 and generates or otherwise provides a reference clock signal that is used by the transmitter PLL 112 to generate a transmit clock signal for synchronizing the data being transmitted over the serial interface 106.

In the illustrated embodiment, the transmitter PLL 112 is coupled to the transmitter 114, and based on the reference clock signal received from the processing system 108, the transmitter PLL 112 generates the transmit clock signal ($C_{TX}$) that is used by the transmitter 114 to transmit data over the serial interface 106 in sync with the transmit clock signal ($C_{TX}$). In an exemplary embodiment, the frequency of the transmit clock signal ($C_{TX}$) is greater than 200 MHz, and is typically within the range of about 1 GHz to about 8 GHz. The illustrated embodiment of FIG. 1 depicts a source-synchronous system, wherein the transmitter PLL 112 is also coupled to a second serial interface 118 and configured to communicate the transmit clock signal ($C_{TX}$) over the second serial interface 118 to the second computing module 104 to support source-synchronous communications between computing modules 102, 104.

The transmitter 114 generally represents the hardware components and/or circuitry of the first computing module 102 that are configured to sequentially transmit electrical signals representative of individual bits of the serialized data from the output of parallel-to-serial conversion circuitry 110 over the serial interface 106 in sync with the rising and/or falling edges of the transmit clock signal ($C_{TX}$) received from the transmitter PLL 112, as described in greater detail below. In an exemplary embodiment, the transmitter 114 is realized as a FIR equalization transmitter configured to equalize the electrical signal representative of a respective bit of the serial data based on performance characteristics (e.g., noise, distortion, attenuation, and the like) of the serial interface 106 utilizing preceding and/or succeeding bits of the serial data. As described in greater detail below, in an exemplary embodiment, the transmitter 114 is configured to achieve a desired equalization of the signal being transmitted over the serial interface 106 while simultaneously achieving a desired effective output impedance that matches the effective input impedance of the receiver 120. In this regard, the transmitter controller 116 generally represents the hardware, firmware, processing logic and/or software (or a combination thereof) that is coupled to the transmitter 114 and configured to control the output impedance of the transmitter 114 by enabling a particular number of driver legs within the transmitter 114 to match an external precision resistance reference 140, and allocating the enabled driver legs that generate the signal being transferred over the serial interface 106 in a manner that achieves a desired equalization, as described in greater detail below. It should be noted that although the transmitter controller 116 is depicted as a distinct element of the first computing module 102, in practice, the features and/or functionality of the transmitter controller 116 may be implemented by the processing system 108 or the transmitter controller 116 may be otherwise integrated with the processing system 108.

In the illustrated embodiment, the second computing module 104 includes, without limitation, a receiver 120 for communicating data over the serial interface 106, a receiver clock and data recovery (CDR) module 122, serial-to-parallel conversion circuitry 124, a second processing system 126, and a receiver controller 130. As illustrated in FIG. 1, the CDR module 122 is coupled to the serial interface 118 and receives the transmit clock signal ($C_{TX}$) generated by the transmitter PLL 112. In an exemplary embodiment, the CDR module 122 removes high frequency jitter and/or distortion from the signal received from the serial interface 118 and provides a cleaned-up clock signal that is aligned with the data being transmitted over the serial interface 106 to the receiver 120. In an exemplary embodiment, the receiver 120 is coupled to the CDR module 122 and generally represents the hardware components and/or circuitry of the second computing module 104 that are coupled to the serial interface 106 and configured to convert electrical signals on the serial interface 106 to serialized digital values that are in sync with rising and/or falling edges of the cleaned-up clock signal received from the CDR module 122. The serial-to-parallel conversion circuitry 124 is coupled to the output of the receiver 120 and the output of the CDR module 122, and the serial-to-parallel conversion circuitry 124 generally represents the hardware components of computing modules 104 that are configured to convert the serialized data from the receiver 120 that is synchronized with the transmit clock signal ($C_{TX}$) to parallel data that is synchronized with the clock domain of the processing system 126. The processing system 126 generally represents the main processing core for the second computing module 104, and the processing system 126 is coupled to the output of the serial-to-parallel conversion circuitry 124 and configured to receive and/or act upon the data from the serial-to-parallel conversion circuitry 124 in a conventional manner. Depending on the embodiment, the processing system 126 may be realized using one or more ALUs, one or more FPUs, one or more memory elements, discrete gate or transistor logic, discrete hardware components, or any combination thereof.

In the illustrated embodiment, the receiver controller 130 generally represents the hardware, firmware, processing logic and/or software (or a combination thereof) that is coupled to the receiver 120 and configured to monitor the signals received by receiver 120 over the serial interface 106 and determine one or more performance metrics (or figures of merit) for the serial interface 106 based on the received signals. For example, the receiver controller 130 may determine one or more performance metrics for the serial interface 106 that correspond to the noise of the serial interface 106, distortion of the serial interface 106, attenuation of the serial interface 106, a bit error rate for the serial interface 106 and/or a voltage margin at the input of the receiver 120. It should be noted that although the receiver controller 130 is depicted as a distinct element of the second computing module 104, in practice, the features and/or functionality of the receiver controller 130 may be implemented by the processing system 126 or the receiver controller 130 may be otherwise integrated with the processing system 126. In some embodiments, the receiver controller 130 may be coupled to a third serial interface 132 and configured to transmit or otherwise communicate the performance metric(s) for the serial interface 106 to the transmitter controller 116.

In an exemplary embodiment, the resistance reference 140 is realized as a resistive element that is precisely controlled to provide a particular resistance that corresponds to the characteristic impedance of the system (e.g., expected input impedance of the receiver 120) or a ratio thereof. In some embodiments, the resistance of the resistance reference 140 may also account for parasitic resistances between the computing modules 102, 104 (e.g., the characteristic impedance plus an offset corresponding to the parasitic resistance of the serial interface 106). Although FIG. 1 depicts the resistance reference 140 as being external to the first computing module 102, in other embodiments, the resistance reference 140 may be implemented as part of the same device package and/or chip as the first computing module 102.

Figure 2:
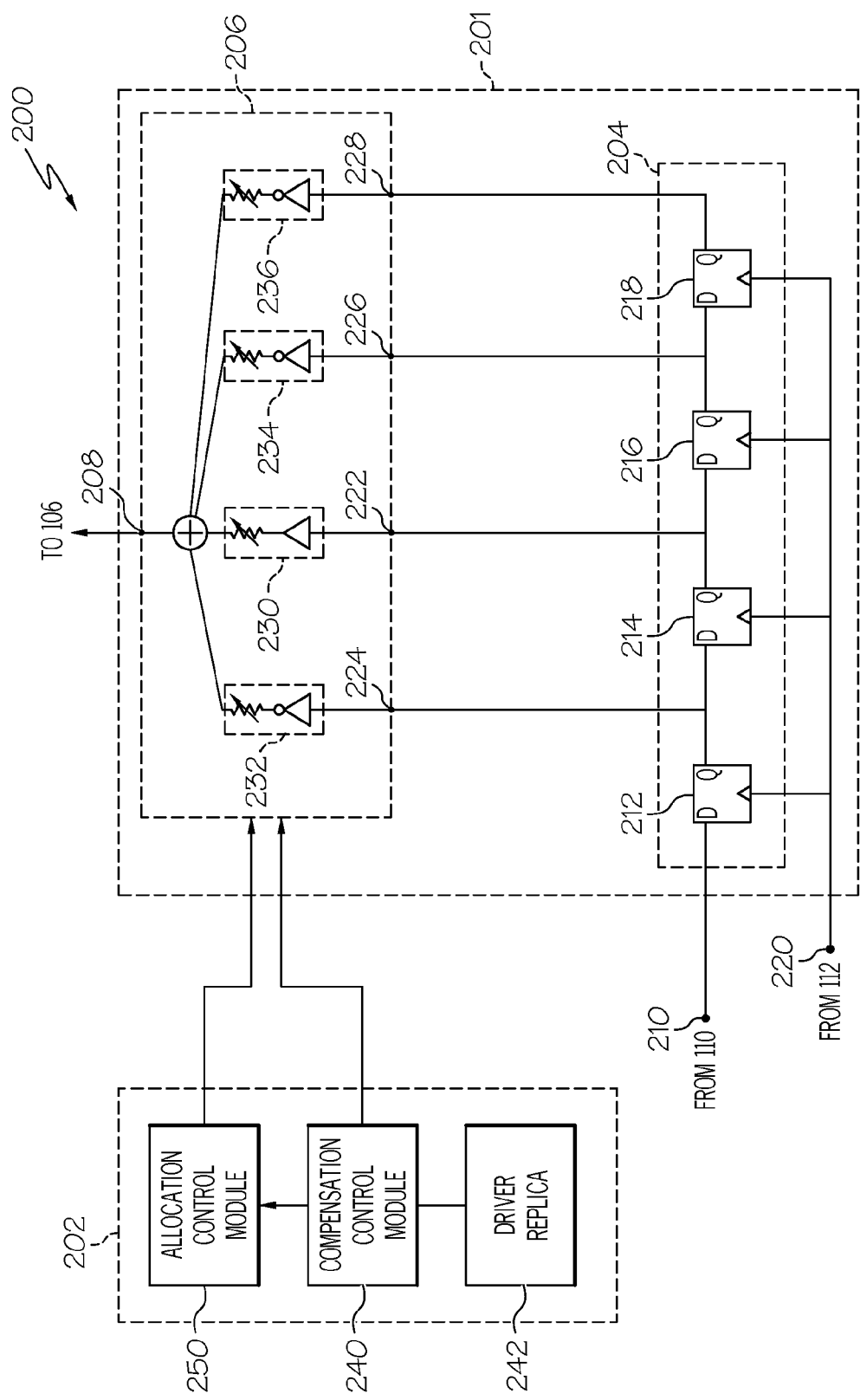
FIG. 2 is a schematic view of a transmitter system suitable for use in the system of FIG. 1 in accordance with one embodiment.

FIG. 2 depicts an exemplary embodiment of a FIR equalization transmitter system 200 suitable for use in the first computing module 102 in the system 100 of FIG. 1. The illustrated embodiment of the FIR equalization transmitter system 200 includes transmitter circuitry 201 coupled to a transmitter control module 202. In this regard, when used with the first computing module 102 of FIG. 1, the transmitter 114 may be realized as the transmitter circuitry 201, and the transmitter controller 116 may be realized as the transmitter control module 202. As described in greater detail below, the transmitter control module 202 configures the transmitter circuitry 201 to achieve a desired equalization of the output signal generated by the transmitter circuitry 201 while at the same time achieving a desired effective output impedance of the transmitter circuitry 201.

The illustrated embodiment of the transmitter circuitry 201 includes, without limitation, a serialized delay arrangement 204 coupled to an input node 210 and driver circuitry 206 coupled to an output node 208. As described in greater detail below, the driver circuitry 206 includes a plurality of driver legs, wherein the transmitter control module 202 is configured to enable a subset of the total number of driver legs inside the driver circuitry 206 to achieve a characteristic output impedance target and allocate subsets of the enabled driver legs among respective bits of delayed serialized data obtained from the serialized delay arrangement 204 to generate an output data signal at the output node 208. In this regard, the output data signal is an electrical signal representative of a particular bit of serialized data received at the input node 210 that has been equalized, filtered, or otherwise modified by electrical signals influenced by the preceding and/or succeeding bits of the serialized data at the output node 208. In an exemplary embodiment, when the transmitter circuitry 201 is utilized as the transmitter 114 in the first computing module 102 of FIG. 1, the input node 210 is coupled to or otherwise configured to receive serialized data from the output of the parallel-to-serial conversion circuitry 110 and the output node 208 is coupled to the serial interface 106. In this regard, the driver circuitry 206 utilizes preceding and/or succeeding bits of the serialized data provided from the parallel-to-serial conversion circuitry 110 to filter or otherwise equalize the output data signal based on characteristics and/or performance metrics of the serial interface 106, as described in greater detail below. Although not illustrated in FIG. 2, in some embodiments, the transmitter circuitry 201 may include bypass logic configured to selectively provide preceding and/or succeeding bits of the serialized data to the driver circuitry 206, as described in U.S. patent application Ser. No. 12/857,225 entitled "ADJUSTABLE FINITE IMPULSE RESPONSE TRANSMITTER," assigned to the assignee of the present application and incorporated by reference herein.

In an exemplary embodiment, the serialized delay arrangement 204 comprises a plurality of serialized delay elements 212, 214, 216, 218 configured to delay a stream of serialized data at the input node 210. In this regard, the input of a first delay element 212 is coupled to or otherwise configured to receive the serial data at the input node 210, the input of the second delay element 214 is coupled to or otherwise configured to receive the output of the first delay element 212, the input of the third delay element 216 is coupled to or otherwise configured to receive the output of the second delay element 214, and the input of the fourth delay element 218 is coupled to or otherwise configured to receive the output of the third delay element 216. In an exemplary embodiment, the delay elements 212, 214, 216, 218 are each realized as flip-flops that are clocked by a clock signal at node 220, that is, the clock input of each delay element 212, 214, 216, 218 is coupled to node 220 as shown. In the illustrated embodiment, the clock signal at node 220 corresponds to bit rate clock signal, wherein the rising edge of the clock signal is synchronized with a respective bit of the serial data at the input node 210, such that bits of the serial data at the input node 210 propagate through delay elements 212, 214, 216, 218 at the bit rate. When the transmitter circuitry 201 is used as the transmitter 114 of FIG. 1, the clock node 220 is coupled to or otherwise configured to receive the transmit clock signal ($C_{TX}$) from the transmitter PLL 112.

In the illustrated embodiment, the output of the second delay element 214 corresponds to the bit that is being represented by the electrical signal at the output node 208, that is, the bit of the serialized data being transmitted by the transmitter circuitry 201 during the current period of the clock signal at node 220. As used herein, the main data bit should be understood as referring to the bit being transmitted by the transmitter circuitry 201 or is otherwise being represented by the electrical signal at the output node 208 during the current period of the clock signal at node 220. In this regard, the output of the third delay element 216 corresponds to the bit of the serial data that was transmitted by the transmitter circuitry 201 during the previous transmission interval (e.g., the main data bit during a preceding period of the clock signal), and the output of the fourth delay element 218 corresponds to the bit of the serial data that was transmitted by the transmitter circuitry 201 two transmission intervals prior to the current transmission interval. Similarly, the output of the first delay element 212 corresponds to the bit of the serial data that will be transmitted by the transmitter circuitry 201 during the subsequent transmission interval (e.g., after the next rising edge of the clock signal). For convenience, but without limitation, the output of the first delay element 212 may alternatively be referred to herein as the precursor data bit and the outputs of the third and fourth delay elements 216, 218 may alternatively be referred to herein as postcursor data bits. In this regard, in the serialized data, a precursor data bit follows or succeeds a main data bit and a postcursor data bit precedes the main data bit. It should be appreciated that although FIG. 2 depicts the serialized delay arrangement 204 having four delay elements 212, 214, 216, 218, practical embodiments of the transmitter circuitry 201 may utilize any number of delay elements for the serialized delay arrangement 204.

In an exemplary embodiment, the driver circuitry 206 is configured as a 4-bit FIR filter that generates the output data signal at output node 208 that is representative of the signal at driver input node 222 in a manner that is influenced by signals at driver input nodes 224, 226, 228. In this regard, the first driver input node 222 is configured to receive the main data bit from the output of delay element 214, the second driver input node 224 is configured to receive the precursor data bit from the output of delay element 212, and the third and fourth driver input nodes 226, 228 are configured to receive a respective postcursor data bit from the output of delay elements 216, 218, respectively. Each respective bit of the delayed serialized data from the serialized delay arrangement 204 is provided to the inputs of a subset of the enabled driver legs in the driver circuitry 206. In the illustrated embodiment, the main data bit at node 222 is provided to a first subset 230 of enabled driver legs, the precursor data bit at node 224 is provided to a second subset 232 of enabled driver legs, the first postcursor data bit at node 226 is provided to a third subset 234 of enabled driver legs, and the second postcursor data bit at node 228 is provided to a fourth subset 236 of enabled driver legs.

Each subset 230, 232, 234, 236 of enabled driver legs functions as a variable gain amplifier arrangement, wherein the outputs of the subsets 230, 232, 234, 236 of enabled driver legs are summed at the output node 208 to generate the equalized output data signal. The effective gain provided by a respective subset 230, 232, 234, 236 of enabled driver legs is proportional to the number of driver legs in that respective subset 230, 232, 234, 236, wherein the number of enabled driver legs in that subset 230, 232, 234, 236 is chosen to generate the output data signal in a manner that achieve a desired equalization of the communication channel (e.g., serial interface 106) coupled to the output node 208. In this regard, the transmitter control module 202 is coupled to the driver legs of the driver circuitry 206 and controls the allocation of the enabled driver legs among the data bits at the driver input nodes 222, 224, 226, 226, which, in turn, controls the effective output impedance of the respective subsets 230, 232, 234, 236 of enabled driver legs, and thereby, the gain provided by the respective subsets 230, 232, 234, 236 of driver legs to achieve particular performance metric (or figure of merit) at the input of the receiver 120. In this manner, the driver circuitry 206 filters or otherwise equalizes the main data bit at driver input node 222 with the precursor and postcursor bits at nodes 224, 226, 228. It should be noted that although FIG. 2 depicts the subsets 232, 234, 236 of enabled driver legs as being configured as inverters that logically invert the precursor and/or postcursor data bits, in other embodiments, the subsets 232, 234, 236 of enabled driver legs may be configured as exclusive-or (XOR) logic gates having an input of the respective XOR logic gates coupled to the transmitter control module 202 to allow the transmitter control module 202 to control whether the output of a respective subset 232, 234, 236 is added or subtracted at the output node 208 to achieve the desired equalization.

It should be understood that FIG. 2 is a simplified representation of the FIR equalization transmitter system 200 for purposes of explanation and ease of description, and FIG. 2 is not intended to limit the subject matter in any way. In this regard, although FIG. 2 depicts filtering or equalizing the main data bit using a single precursor data bit and two postcursor data bits, it should be appreciated that, in practice, the combination and/or number of precursor and/or postcursor data bits may vary depending on the needs of a particular application, and the subject matter described herein may be implemented in an equivalent manner for any combination and/or number of precursor and/or postcursor data bits. Additionally, although FIG. 2 depicts a single-ended full-rate implementation of the FIR equalization transmitter system 200, in practice, the FIR equalization transmitter system 200 may be implemented in a differential manner and/or with a half-rate architecture.

Figure 3:
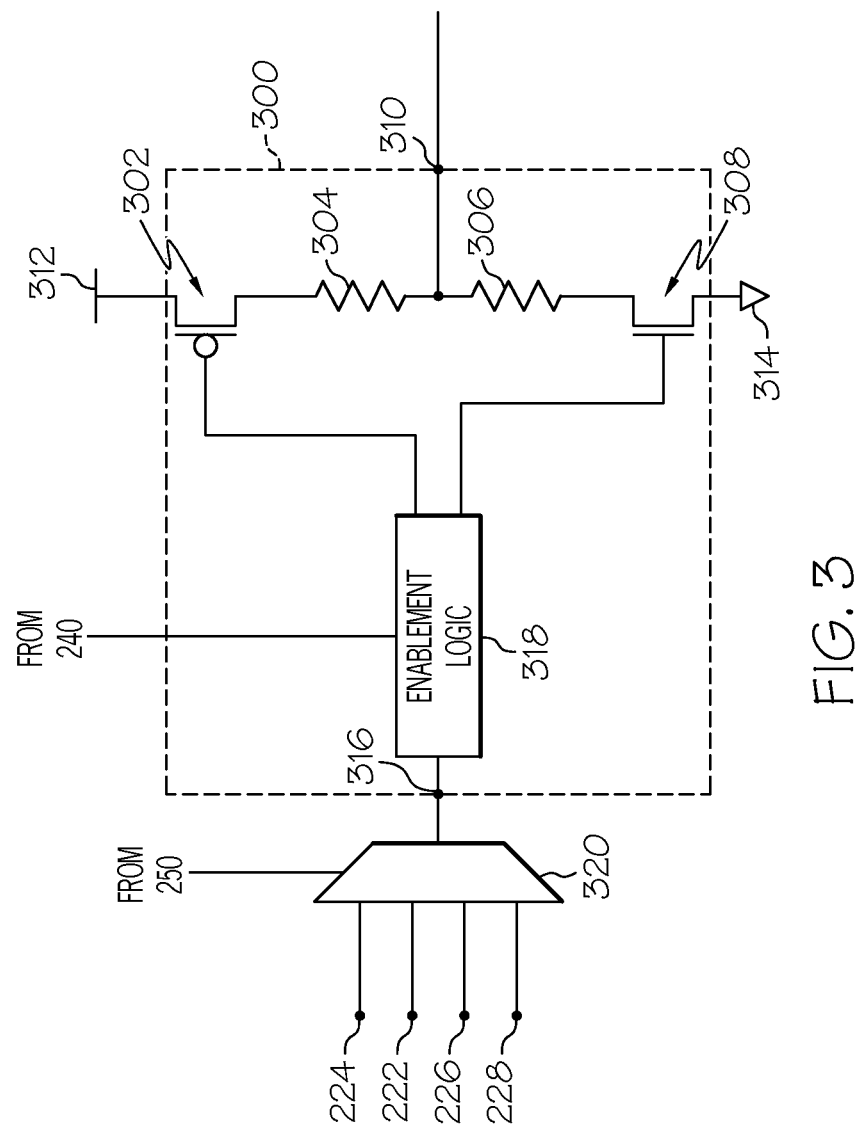
FIG. 3 is a schematic view of a driver leg suitable for use in the transmitter system of FIG. 2 in accordance with one embodiment.

FIG. 3 depicts an exemplary embodiment of a driver leg 300 suitable for use in the driver circuitry 206 of FIG. 2. In this regard, the driver circuitry 206 includes a plurality of instances of driver leg 300, wherein the transmitter control module 202 enables a subset of the total number of driver legs 300 to achieve a characteristic output impedance target, as described in greater detail below. Thus, each subset 230, 232, 234, 236 of enabled driver legs may include one or more instances of driver leg 300, wherein the cumulative number of enabled driver legs in the subsets 230, 232, 234, 236 provides a desired output impedance at the output node 208.

In an exemplary embodiment, each instance of driver leg 300 includes, without limitation, a first transistor 302, a first resistance element 304 coupled between the first transistor 302 and an output node 310, a second transistor 308, and a second resistance element 306 coupled between the second transistor 308 and the output node 310. In an exemplary embodiment, a drain/source terminal of the first transistor 302 is coupled to a positive reference voltage node 312, a source/drain terminal of the second transistor 308 is coupled to a negative reference voltage node 314, and the output node 310 of the driver leg 300 is coupled to the output node 208 of the transmitter circuitry 201. In an exemplary embodiment, the resistance elements 304, 306 are substantially identical and have the same resistance value (e.g., within realistic and/or practical manufacturing tolerances), and the transistors 302, 308 have substantially the same widths such that the impedance between nodes 312 and 310 is substantially equal to the impedance between nodes 310 and 314.

In the illustrated embodiment, each driver leg 300 has an input 316 configured to receive a respective data bit from serialized delay arrangement 204 via input selection circuitry 320, wherein the respective data bit selected by input selection circuitry 320 is provided to enablement logic 318. In this regard, the input selection circuitry 320 controls which of the data bits (e.g., the main data bit, precursor data bit, or postcursor data bits) from the serialized delay arrangement 204 is provided to the input node 316 of the respective driver leg 300, as described in greater detail below. The enablement logic 318 generally represents the hardware, circuitry and/or logic configured to control operation of the transistors 302, 308 to disable and/or enable the respective driver legs 300. As set forth below, to disable a respective instance of driver leg 300 inside the driver circuitry 206, the enablement logic 318 provides signals to the control (or gate) terminals of the transistors 302, 308 to turn off or otherwise deactivate the transistors 302, 308. Conversely, to enable a respective instance of driver leg 300, the enablement logic 318 operates the transistors 302, 308 in a manner that allows the electrical signal generated at the output node 208 to be influenced by the input data bit at the input node 316 when the driver leg 300 is enabled.

Referring again to FIG. 2, and with continued reference to FIG. 1 and FIG. 3, in an exemplary embodiment, the transmitter control module 202 includes a compensation control module 240 that is coupled to the enablement logic 318 of each instance of driver leg 300 in the driver circuitry 206 and configured to control the number of instances of the driver legs 300 that are enabled within the driver circuitry 206 to achieve a characteristic output impedance target, as described in greater detail below. In an exemplary embodiment, the transmitter control module 202 includes a driver replica 242 that represents a copy of the total number of driver legs 300 inside the driver circuitry 206, wherein the compensation control module 240 is configured to compare the resistance reference 140 to the effective resistance provided by a subset of the total number of driver legs 300 of the driver replica 242 in order to determine the number of instances of the driver legs 300 that should be enable inside the driver circuitry 206 to achieve the characteristic output impedance target at the output node 208. The transmitter control module 202 also includes an allocation control module 250 that is coupled to the input selection circuitry 320 of each instance of driver leg 300 in the driver circuitry 206 and configured to control the number of enabled driver legs 300 that each respective data bit from the serialized delay arrangement 204 is provided to (i.e., the number of enabled driver legs 300 in each subset 230, 232, 234, 236) in order to achieve a desired equalization ratio.

Figure 4:
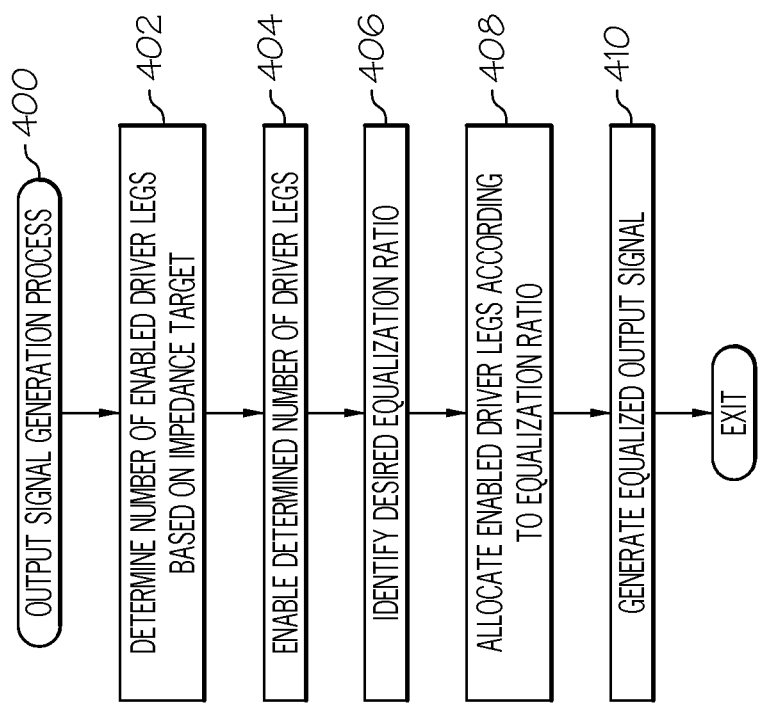
FIG. 4 is a flow diagram of an exemplary output signal generation process suitable for use with the system of FIG. 1 or the transmitter system of FIG. 2.

Referring now to FIG. 4, in an exemplary embodiment, an equalization transmitter system may be configured to perform an output signal generation process 400 and additional tasks, functions, and operations described below. The various tasks may be performed by software, hardware, firmware, or any combination thereof. For illustrative purposes, the following description may refer to elements mentioned above in connection with FIGS. 1-3. In practice, the tasks, functions, and operations may be performed by different elements of the described system, such as the transmitter 114, the transmitter controller 116, the transmitter circuitry 201, the transmitter control module 202, the compensation control module 240, the allocation control module 250, the serialized delay arrangement 204 and/or the driver circuitry 206. It should be appreciated that any number of additional or alternative tasks may be included, and may be incorporated into a more comprehensive procedure or process having additional functionality not described in detail herein.

Referring to FIG. 4, and with continued reference to FIGS. 1-3, the output signal generation process 400 initializes or begins determining a number of driver legs inside the driver circuitry of the transmitter that should be enabled to achieve a characteristic output impedance target (task 402). In an exemplary embodiment, the resistance reference 140 provides a resistance corresponding to the characteristic output impedance target. In accordance with one embodiment, to determine the number of driver legs 300 inside the driver circuitry 206 to be enabled, the transmitter controller 116, 202 and/or compensation control module 240 sequentially enables individual driver legs 300 of the driver replica 242 and compares the effective resistance of the enabled replica driver legs 300 to the resistance reference 140 until the enabled replica driver legs 300 provide an impedance that matches the resistance reference 140. For example, the compensation control module 240 may implement a voltage divider circuit by placing the enabled replica driver legs 300 in series with the resistance reference 140. The compensation control module 240 may initially enable one replica driver leg 300, and then sequentially increase the number of replica driver legs 300 that are enabled until the voltage across the enabled replica driver legs 300 is substantially equal to the voltage across the resistance reference 140. In some embodiments, the resistance reference 140 may be selectable or otherwise configurable to provide multiple possible resistance references. In such embodiments, the transmitter controller 116, 202 and/or compensation control module 240 may identify the characteristic output impedance target for the transmitter 114, 201 and select or otherwise configured the resistance reference 140 for the appropriate impedance. For example, the transmitter controller 116, 202 and/or compensation control module 240 may access and/or monitor a control status register that indicates a desired characteristic output impedance for the transmitter 114, 201 and/or driver circuitry 206. In other embodiments, the processing system 108 may signal the transmitter controller 116, 202 and/or compensation control module 240 to implement the desired characteristic output impedance.

In an exemplary embodiment, after determining the number of driver legs needed to achieve the characteristic output impedance target, the output signal generation process 400 continues by enabling the determined number of driver legs inside the driver circuitry of the transmitter (task 404). In this regard, the transmitter controller 116, 202 and/or compensation control module 240 enables a subset of the total number of driver legs 300 of the driver circuitry 300 to provide an impedance at the output node 208 that is substantially the same as the impedance of the enabled replica driver legs 300 of the driver replica 242, which, in turn, matches the output impedance target provided by the resistance reference 140. For example, in accordance with one or more embodiments, the compensation control module 240 provides signals to the enablement logic 318 of the determined number of driver legs 300 inside the driver circuitry 206 to allow the selected input data bit at the inputs 316 of the respective driver legs 300 to influence or otherwise control operation of the transistors 302, 308. In this manner, the transmitter controller 116, 202 and/or compensation control module 240 enables the determined number of driver legs 300 inside the driver circuitry 206. For the remaining driver legs 300 inside the driver circuitry 206 that are not needed to achieve the characteristic output impedance target, the compensation control module 240 provides signals to the enablement logic 318 to turn off the transistors 302, 308, and thereby disable the remaining driver legs 300 by preventing them from conducting current and influencing the signal at the output node 208, 310.

In an exemplary embodiment, the output signal generation process 400 continues by identifying desired equalization ratios for equalizing the output signal transmitted over the serial interface (task 406). In this regard, the transmitter controller 116, 202 and/or allocation control module 250 may access and/or monitor a control status register that indicates the desired equalization ratio for the serial interface 106. In other embodiments, the processing system 108 and/or receiver controller 130 may signal the transmitter controller 116, 202 and/or allocation control module 250 to implement the desired equalization ratio. The desired equalization ratio (or de-emphasis ratio) is chosen to achieve a particular performance metric (or figure of merit) at the input of the receiver 120 based on characteristics of the serial interface 106.

After identifying the desired equalization ratio, the output signal generation process 400 continues by allocating the enabled driver legs inside the driver circuitry among the data bits according to the identified equalization ratio in order to achieve the desired equalization of the output signal (task 408). In this regard, the transmitter controller 116, 202 and/or allocation control module 250 allocates the enabled driver legs 300 inside the driver circuitry 206 among the delayed bits of serialized data from the serialized delay arrangement 204 at driver input nodes 222, 224, 226, 228 by operating the input selection circuitry 320 of the enabled driver legs 300 to implement the desired equalization ratio. In this regard, the allocation control module 250 receives the number of enabled driver legs 300 inside the driver circuitry 206 from the compensation control module 240 and calculates, for each respective data bit from the serialized delay arrangement 204, a number of enabled driver legs 300 to be allocated to that respective data bit (i.e., the number of enabled driver legs 300 for the respective subset of driver legs 230, 232, 234, 236) by multiplying the total number of enabled driver legs 300 inside the driver circuitry 206 by a particular weighting for that respective data bit. For example, if the desired equalization ratio provides a particular weighting for the precursor data bit, the allocation control module 250 multiplies the total number of enabled driver legs 300 inside the driver circuitry 206 by that desired weighting to determine the number of enabled driver legs 300 to be allocated to the precursor data bit at node 224 (i.e., the number of enabled driver legs 300 in subset 232). After determining the number of enabled driver legs 300 to be allocated to the precursor data bit, the allocation control module 250 operates the input selection circuitry 320 for that number of enabled driver legs 300 to provide the precursor data bit to the inputs 316 of that subset 232 of the total number of enabled driver legs 300. In this manner, the respective transistors 302, 308 of the enabled driver legs 300 in that subset 232 may be controlled or otherwise influenced by the precursor data bit at node 224 to generate a component of the output signal at the output node 208 that is attributable to or otherwise representative of the precursor data bit. In a similar manner, for the remaining data bits, the allocation control module 250 multiplies the total number of enabled driver legs 300 inside the driver circuitry 206 by the desired weighting for each respective data bit to determine the number of enabled driver legs 300 to be allocated to that respective data bit, and operates the input selection circuitry 320 for that number of enabled driver legs 300 to allow their respective transistors 302, 308 to be controlled or otherwise influenced by that respective data bit, and thereby generate a component of the output signal at the output node 208 that is attributable to or otherwise representative of the respective data bit. In this manner, the allocation control module 250 allocates the enabled driver legs 300 of the driver circuitry 206 in accordance with the equalization ratio to achieve the desired equalization of the output signal at the output node 208.

For example, if the compensation control module 240 enables one hundred driver legs 300 inside the driver circuitry 206 to achieve the characteristic output impedance target and the desired equalization ratio corresponds to a weighting of ten percent for the precursor data bit, the allocation control module 250 multiplies the total number of enabled driver legs 300 by the desired weighting to determine that ten of the enabled driver legs 300 should be allocated to the precursor data bit. The allocation control module 250 then operates the input selection circuitry 320 associated with ten of the enabled driver legs 300 in the driver circuitry 206 to provide the precursor data bit at node 224 to the inputs 316 of those ten enabled driver legs 300, thereby allowing the precursor data bit to control or otherwise influence the operation of the respective transistors 302, 308 of those ten enabled driver legs 300. In this manner, ten percent of the output impedance of the driver circuitry 206 is allocated to the precursor data bit, that is, the subset of driver legs 232 associated with the precursor data bit comprises ten percent of the total number of enabled driver legs 300 in the driver circuitry 206. In a similar manner, if the desired equalization ratio corresponds to a weighting of twenty percent for the first postcursor data bit, the allocation control module 250 operates the input selection circuitry 320 associated with twenty of the enabled driver legs 300 to provided the first postcursor data bit at node 226 to the inputs 316 of those ten enabled driver legs 300, thereby allowing the first postcursor data bit to control or otherwise influence the operation of the respective transistors 302, 308 of those twenty enabled driver legs 300. In this manner, twenty percent of the output impedance of the driver circuitry 206 is allocated to the first postcursor data bit, that is, the subset of driver legs 234 associated with the first postcursor data bit comprises twenty percent of the total number of enabled driver legs 300 in the driver circuitry 206. If the desired equalization ratio corresponds to a weighting of five percent for the second postcursor data bit, the allocation control module 250 operates the input selection circuitry 320 associated with five of the enabled driver legs 300 to provide the second postcursor data bit at node 228 to the inputs 316 of those five enabled driver legs 300, thereby allowing the second postcursor data bit to control or otherwise influence the operation of the respective transistors 302, 308 of those five enabled driver legs 300. In this manner, five percent of the output impedance of the driver circuitry 206 is allocated to the second postcursor data bit, that is, the subset of driver legs 236 associated with the second postcursor data bit comprises five percent of the total number of enabled driver legs 300 in the driver circuitry 206. In an exemplary embodiment, the allocation control module 250 allocates the remaining enabled driver legs 300 to the main data bit at node 222 by operating the input selection circuitry 320 of the remaining driver legs to provide the main data bit at node 222 to be provided to their respective inputs 316, thereby allowing allow the main data bit at node 222 to control or otherwise influence the operation of the respective transistors 302, 308 for the remaining enabled driver legs 300. In this regard, in some embodiments, the allocation control module 250 and/or input selection circuitry 320 may be configured to allocate the driver legs 300 of the driver circuitry 206 to the main data bit at node 222 by default upon initialization of the transmitter circuitry 201. For the above-described exemplary case, the allocation control module 250 operates the input selection circuitry 320 associated with sixty five of the enabled driver legs 300 (e.g., the remaining enabled driver legs of the one hundred enabled driver legs after allocating enabled driver legs to the precursor and postcursor data bits) to provide the main data bit at node 222 to be provided to their respective inputs 316, thereby allowing allow the main data bit at node 222 to control or otherwise influence the operation of the respective transistors 302, 308 for sixty five of the enabled driver legs 300 in the driver circuitry 300.

It should be noted that although the subject matter is described herein in the context of the all of the enabled driver legs having substantially the same resistance, in some embodiments, the resistances of the driver legs may be varied or scaled with respect to each other (e.g., a subset of the driver legs each provide a resistance R, another subset of the driver legs each provide a resistance of 2R, another subset of the driver legs each provide a resistance of 4R, and so on), wherein the allocation control module 250 keeps track of the respective weightings of the different enabled driver legs with respect to one another when allocating the driver legs among the data bits.

Still referring to FIG. 4, and with continued reference to FIGS. 1-3, after allocating the enabled driver legs to achieve the desired equalization ratio, the output signal generation process 400 continues by generating an equalized output signal at the output of the transmitter that equalizes the communication channel (task 410). In this regard, as described above, the output nodes 310 of the enabled driver legs 300 are connected together at the output node 208, such that the signals generated by the individual subsets 230, 232, 234, 236 of enabled driver legs 300 are combined to provide an equalized output signal at the output node 208 that is representative of the main data bit at node 222. Each of the respective data bits at nodes 222, 224, 226, 228 influences or otherwise controls operation of the transistors 302, 308 of its associated subset 230, 232, 234, 236 of the enabled driver legs 300 to produce a signal at the output node 208 that is combined with the signals generated by the other subsets 230, 232, 234, 236 of the enabled driver legs 300 and weighted in accordance with the desired equalization ratio to obtain the equalized output signal at the output node 208. For example, the precursor subset 232 generates a signal representative of the precursor data bit from delay element 212, the main subset 230 generates a signal representative of the main data bit from delay element 214, the first postcursor subset 234 generates a signal representative of the first postcursor data bit from delay element 216, and the second postcursor subset 236 generates a signal representative of the second postcursor data bit from delay element 218, wherein the individual component signals are combined, multiplexed, or otherwise added together at the output node 208 to obtain the output signal. In this manner, the output signal represents a combination of a first signal component that is influenced by the precursor data bit, a second signal component that is influenced by the main data bit, a third signal component that is influenced by the first postcursor data bit, and a fourth signal component that is influenced by the second postcursor data bit. At the same time, the effective output impedance of the enabled driver legs 300 coupled to the output node 208 and/or serial interface 106 is substantially equal to the characteristic output impedance target, as described above.

Figure 5:
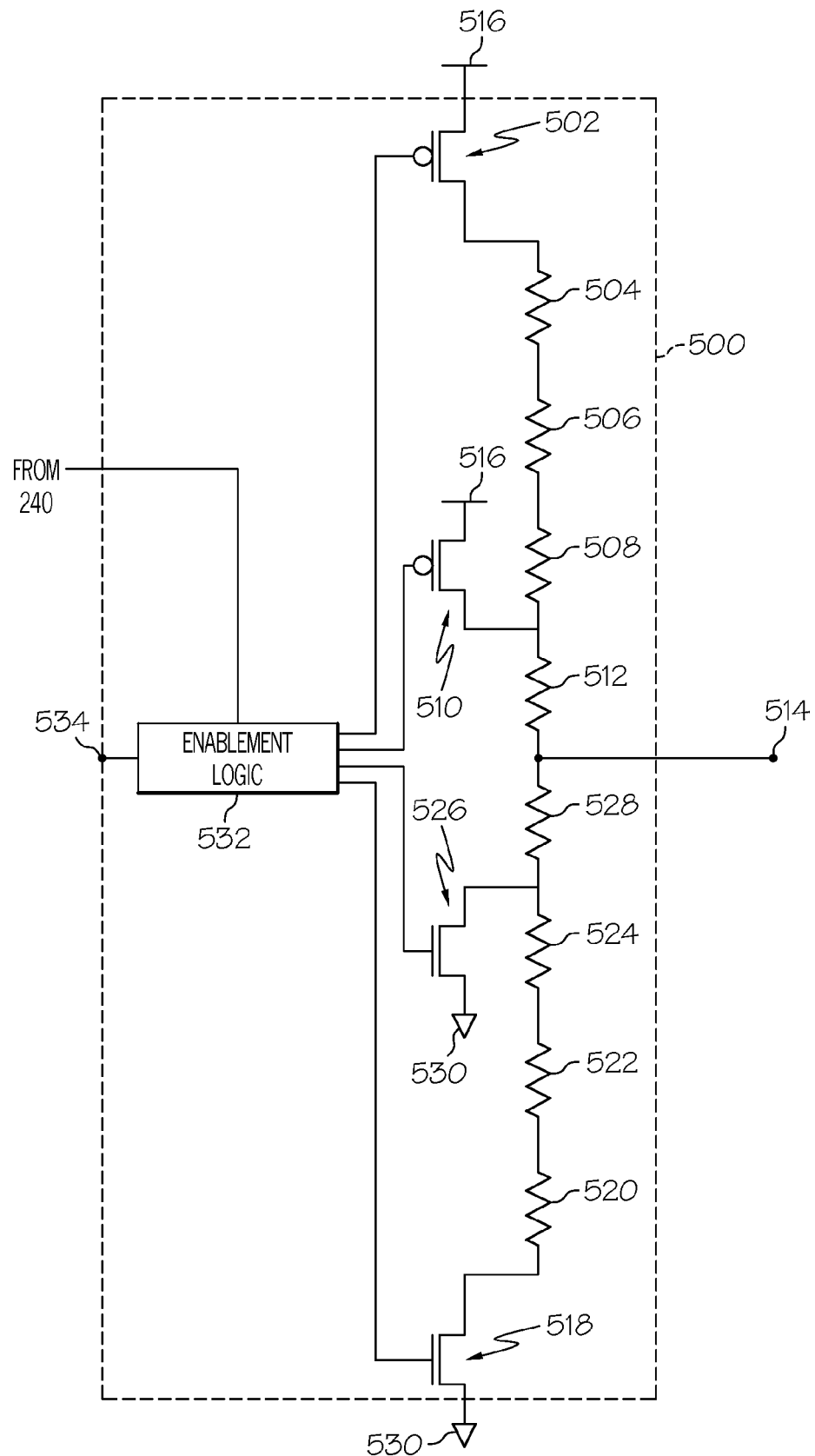
FIG. 5 is a schematic view of a configurable driver leg suitable for use in the transmitter system of FIG. 2 in accordance with one embodiment.

FIG. 5 depicts an exemplary embodiment of a configurable driver leg 500 suitable for use in the driver replica 242 and/or driver circuitry 206 of FIG. 2. The illustrated embodiment of driver leg 500 includes, without limitation, a first transistor 502, a plurality of resistance elements 504, 506, 508 coupled between the first transistor 502 and a terminal of a second transistor 510, and another resistance element 512 coupled between the terminal of the second transistor 510 and an output node 514. As illustrated, a drain/source terminal of the first transistor 502 is coupled to a positive reference voltage node 516, and a source/drain terminal of the first transistor 502 is coupled to resistance element 504. A drain/source terminal of the second transistor 510 is also coupled to the positive reference voltage node 516 and a source/drain terminal of the first transistor 502 is coupled to the output node 514 via resistance element 512. In this manner, when the second transistor 510 is turned on or otherwise activated, the first transistor 502 and resistance elements 504, 506, 508 are effectively disabled, as described in greater detail below. The driver leg 500 also includes a third transistor 518, a plurality of resistance elements 520, 522, 524 coupled between the third transistor 518 and a terminal of a fourth transistor 526, and another resistance element 528 coupled between the terminal of the fourth transistor 526 and the output node 514. In a similar manner as described above, a source/drain terminal of each of the transistors 518, 526 are coupled to a negative (or ground) reference voltage node 530, such that when the fourth transistor 526 is turned on or otherwise activated, the third transistor 518 and resistance elements 520, 522, 524 are effectively disabled, as described in greater detail below.

In an exemplary embodiment, the configurable driver leg 500 includes enablement logic 532 coupled to the control (or gate) terminals of the transistors 502, 510, 518, 526. When the configurable driver leg 500 is to be enabled, the enablement logic 532 is configured to control whether a first pair of the transistors 510, 526 or a second pair of the transistors 502, 518 generates the output signal at the output node 514 while disabling the other pair of the transistors to achieve a desired impedance for the configurable driver leg 500. In this regard, to configure the driver leg 500 for a lower effective impedance, the enablement logic 532 allows an input signal at an input node 534 to influence or otherwise control operation of transistors 510, 518 while disabling the other pair of transistors 502, 518 (e.g., by applying signals to the gate terminals to turn off the transistors 502, 518). Turning off the transistors 502, 518 effectively disables the resistance elements 504, 506, 508, 520, 522, 524, and thereby reduces the effective impedance of the driver leg 500. Conversely, to configure the driver leg 500 for a greater effective impedance, the enablement logic 532 allows the input signal at the input node 534 to influence or otherwise control operation of transistors 502, 518 while disabling the other pair of transistors 510, 526 (e.g., by applying signals to the gate terminals to turn off the transistors 510, 526). When transistors 510, 526 are turned off, the resistance elements 504, 506, 508, 512, 520, 522, 524, 528 are all effectively enabled and coupled to the output node 514, thereby increasing the effective impedance of the driver leg 500.

In an exemplary embodiment, the resistance elements 504, 506, 508, 512, 520, 522, 524, 528 are substantially identical and have the same resistance value (e.g., within realistic and/or practical manufacturing tolerances). Additionally, the widths of the transistors 510, 526 are scaled with respect to the widths of transistors 502, 518 to provide a relatively constant ratio of the resistance attributable to enabled transistors to the resistance of the enabled resistance elements regardless of which pair of transistors is enabled. In this regard, for the illustrated embodiment, the width of the transistors 510, 526 are four times the width of transistors 502, 518.

Still referring to FIG. 5, and with reference to FIGS. 2 and 4, in accordance with one or more embodiments, the driver legs of the driver replica 242 are realized as configurable driver leg 500 to allow the driver circuitry 206 to be calibrated for the same characteristic impedance target using different reference resistances. For example, the resistances of the resistance elements 504, 506, 508, 512, 520, 522, 524, 528 and the widths of transistors 502, 510, 518, 526 are chosen to facilitate calibrating the driver circuitry 206 to fifty ohms using a fifty ohm reference resistance or a two hundred ohm reference resistance. In this regard, the compensation control module 240 may initially configure the enablement logic 532 of the configurable driver legs 500 in the driver replica 242 for a two hundred ohm reference by disabling the transistors 510, 526 and allowing the transistors 502, 518 to influence the output signal at the output node 514. As described above, the compensation control module 240 may sequentially enable individual driver legs 500 of the driver replica 242 and compare the effective resistance of the enabled replica driver legs 500 to the resistance reference 140. In an exemplary embodiment, in response to determining that all of the replica configurable driver legs 500 have been enabled and the effective impedance of the enabled replica driver legs 500 is still greater than the resistance reference 140 (e.g., when the reference resistance is fifty ohms), the compensation control module 240 configures the enablement logic 532 to disable the transistors 502, 518 and allowing transistors 510, 526 to influence the output signal at the output node 514, and thereby, disabling the additional resistance elements 504, 506, 508, 520, 522, 524 and decreasing the impedance of the individual replica driver legs 500 for use with the smaller reference resistance. The compensation control module 240 repeats the steps of sequentially enabling individual driver legs 500 of the driver replica 242 and comparing the effective resistance of the enabled replica driver legs 500 to the resistance reference 140 until enabling a number of replica driver legs 500 that achieves the characteristic output impedance target, in a similar manner as described above. Thus, the configurable driver legs 500 may be utilized in the driver circuitry 206 and/or driver replica 242 of the transmitter 114, 201 to allow the transmitter 114, 201 and/or driver circuitry 206 to be calibrated using different reference resistances. In yet other alternative embodiments, the driver legs in the driver circuitry 206 may be realized using configurable driver legs 500 to calibrate the driver circuitry 206 for different characteristic output impedance targets.

To briefly summarize, one advantage of the apparatus, systems and methods described herein is that the FIR equalization transmitter is capable of simultaneously achieving a desired equalization ratio and a desired effective output impedance in an accurate and repeatable manner. As a result, the effects of intersymbol interference and signal reflections may be mitigated, thereby improving the effectiveness of communicating data over a particular communication channel.

For the sake of brevity, conventional techniques related to FIR filters and/or digital filters, serial communications, parallel-to-serial and/or serial-to-parallel conversion, circuit design, signaling, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used in the foregoing description for the purpose of reference only, and thus are not intended to be limiting, and the terms "first", "second" and other such numerical terms referring to structures do not imply a sequence or order unless clearly indicated by the context.

The foregoing description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. As used herein, a "node" means any internal or external reference point, connection point, junction, signal line, conductive element, or the like, at which a given signal, logic level, voltage, data pattern, current, or quantity is present.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient and edifying road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A transmitter comprising:
   driver circuitry configured to generate an output signal at an output node, the driver circuitry including a plurality of driver legs and the output signal being generated based on a plurality of data bits;
   an allocation control module coupled to the driver circuitry, wherein the allocation control module is configured to allocate a respective subset of a set of enabled driver legs of the plurality of driver legs to each respective data bit of the plurality of data bits for generating a respective component of the output signal influenced by the respective data bit; and
   a compensation control module coupled to the driver circuitry and the allocation control module, wherein the compensation control module is configured to enable a first number of the plurality of driver legs, resulting in the set of enabled driver legs comprising a subset of the plurality of driver legs.

2. The transmitter of claim 1, wherein for each respective data bit of the plurality of data bits, the allocation control module is configured to:
   calculate a respective number of driver legs to be allocated to that respective data bit based on the first number of enabled driver legs and an equalization ratio for that respective data bit; and
   provide that respective data bit to inputs of a subset of the set of enabled driver legs, the subset having the respective number of enabled driver legs.

3. The transmitter of claim 2, the output node of the driver circuitry being coupled to a serial interface, the equalization ratio being configured to equalize the serial interface, wherein:

each of the enabled driver legs has an output coupled to the output node; and each of the enabled driver legs is configured to generate a signal at the output node that is influenced by the respective data bit at its input.

4. The transmitter of claim 2, wherein:

each respective driver leg of the set of enabled driver legs has an input coupled to input selection circuitry configured to receive the plurality of data bits; and the allocation control module is configured to operate the input selection circuitry to provide each respective data bit of the plurality of data bits to the input of the respective number of driver legs of the set of enabled driver legs.

5. The transmitter of claim 1, wherein the compensation control module is configured to determine the first number of driver legs to be enabled to achieve a characteristic impedance target.

6. The transmitter of claim 1, wherein the compensation control module is configured to disable a second number of the plurality of driver legs, resulting in a set of disabled driver legs comprising remaining driver legs of the plurality of driver legs after enabling the first number of the plurality of driver legs.

7. A transmitter comprising:

driver circuitry configured to generate an output signal at an output node, the driver circuitry including a plurality of driver legs and the output signal being generated based on a plurality of data bits, the plurality of driver legs comprising a number of enabled driver legs; and an allocation control module coupled to the driver circuitry, wherein the allocation control module is configured to allocate a respective subset of the number of enabled driver legs to each respective data bit of the plurality of data bits for generating a respective component of the output signal influenced by the respective data bit by:

calculating, for each respective data bit of the plurality of data bits, a respective number of driver legs based on the number of enabled driver legs and an equalization ratio for that respective data bit; and providing that respective data bit to inputs of a subset of the number of enabled driver legs, the subset including the respective number of driver legs.

8. The transmitter of claim 7, the output node of the driver circuitry being coupled to a serial interface, wherein:

each driver leg of the number of enabled driver legs has an output coupled to the output node; and each driver leg of the number of enabled driver legs is configured to generate a signal at the output node that is influenced by the respective data bit at its input.

9. A computing module comprising:

a processing system;

a transmitter coupled to the processing system for transmitting an output signal representative of a first bit of data from the processing system over a serial interface, wherein the transmitter is configured to equalize the output signal using a second bit of the data in accordance with an equalization ratio, the transmitter including a total number of driver legs; and a control module configured to:

enable a first number of driver legs of the total number of driver legs, resulting in the set of driver legs configured to generate the output signal, the set of driver legs comprising a subset of the total number of driver legs; and allocate the set of driver legs among the first bit and the second bit based on the equalization ratio.

10. The computing module of claim 9, wherein the control module is configured to allocate the set of driver legs among the first bit and the second bit by:

multiply the first number by the equalization ratio to obtain a second number of driver legs to be allocated to the second bit; and providing the second bit to inputs of a subset of the first number of enabled driver legs, the subset including the second number of driver legs.

11. The computing module of claim 10, wherein the control module is configured provide the first bit to inputs of remaining driver legs of the first number of enabled driver legs after providing the second bit to inputs of the subset of the enabled driver legs.

12. The computing module of claim 9, wherein the control module is configured to determine the first number of driver legs based on a characteristic impedance target.

13. A method for generating an output signal representative of a first bit of serial data at an output node coupled to a serial interface using a plurality of driver legs having their outputs coupled to the output node, the method comprising:

determining a first number of driver legs of the plurality of driver legs for achieving an impedance target at the output node;

enabling the first number of the plurality of driver legs, resulting in a set of enabled driver legs;

allocating the set of enabled driver legs among the first bit and a second bit of the serial data based on an equalization ratio for the serial interface, the equalization ratio providing a desired weighting for the second bit, wherein allocating the set of enabled driver legs among the first bit and the second bit comprises:

determining a second number of driver legs based on the first number and the desired weighting for the second bit; and providing the second bit to inputs of the second number of driver legs of the set of enabled driver legs; and generating the output signal using the set of enabled driver legs.

14. The method of claim 13, wherein determining the second number comprises multiplying the first number by the desired weighting for the second bit to obtain the second number.

15. The method of claim 13, wherein allocating the set of enabled driver legs among the first bit and the second bit further comprises providing the first bit to inputs of a third number of driver legs of the set of enabled driver legs, the third number being less than or equal to a difference between the first number and the second number.

16. The method of claim 15, wherein generating the output signal comprises:

generating, using the second number of enabled driver legs, a first signal influenced by the second bit;

generating, using the third number of enabled driver legs, a second signal influenced by the first bit; and combining the first signal and the second signal at the output node.

* * * * *